US005207810A

United States Patent [19]

Sheth

[11] Patent Number: 5,207,810

[45] Date of Patent: May 4, 1993

[54] SUBMERSIBLE WELL PUMP GAS SEPARATOR

[75] Inventor: Ketankumar K. Sheth, Tulsa, Okla.

[73] Assignee: Baker Hughes Incorporated, Houston, Tex.

[21] Appl. No.: 880,488

[22] Filed: May 6, 1992

Related U.S. Application Data

[63] Continuation of Ser. No. 690,704, Apr. 24, 1991, abandoned.

[51] Int. Cl.[5] .............................................. B01D 45/00

[52] U.S. Cl. .................................. 55/406; 166/105.5; 166/105.6

[58] Field of Search .......................... 166/105.5, 105.6; 55/406

[56] References Cited

U.S. PATENT DOCUMENTS 3,887,342 6/1975 Brunnelle ........................ 166/105.5
3,972,352 8/1976 Bunnelle .............................. 138/42
4,088,459 5/1978 Tuzson .................................. 55/203
4,481,020 11/1984 Lee et al. ........................ 166/105.5
4,913,630 4/1990 Cotherman et al. ............... 417/313

*Primary Examiner*—Bernard Nozick
*Attorney, Agent, or Firm*—James E. Bradley

[57] ABSTRACT

A gas separator for a submersible centrifugal pump for a well separates gas from liquid components of the well fluid. The gas separator has a rotatably driven rotor. The rotor has an outer cylinder, an inner hub and a longitudinal vane that extends between the inner hub and outer cylinder. Notches are formed in the upper edge of the vanes. A discharge member, mounted above the rotor, has a depending skirt that extends into the notches. This defines a separate inner flow path for gas to flow out of the separator into the well. The unseparated portions of the well fluid flow in a clearance between the skirt and the housing into a pump intake. Supports extend out from the discharge member for securing the discharge member in the housing.

10 Claims, 4 Drawing Sheets

SUBMERSIBLE WELL PUMP GAS SEPARATOR

This application is a continuation of application Ser. No. 690,704, filed Apr. 24, 1991 now abandoned.

BACKGROUND OF THE INVENTION

1. Field of the invention

This invention relates in general to electrically driven centrifugal submersible well pumps, and in particular to a gas separator for separating gas from the well fluid prior to reaching the pump.

2. Description of the Prior Art

Submersible well pumps of the type concerned herein are centrifugal and driven by a downhole electrical motor. A pump will have a large number of stages, each stage having an impeller rotatably driven within a diffuser. These pumps are used to pump large volumes of fluid, such as oil and water from wells.

Most oil wells typically will also produce some gas. If the gas is of sufficient volume, it can reduce the performance of the pump. In these circumstances, gas separators are mounted in the assembly below the pump and above the motor and the mechanical seal.

Prior art gas separators utilize a rotatably driven rotor within a cylindrical housing. The rotor has at least one blade or vane. The vane will impart a centrifugal force to the well fluid flowing through the housing. This centrifugal force tends to separate the liquid components from the gas components because of differance in densities, with the liquid components locating near the outer wall of the housing, and the gas remaining near the shaft.

A discharge member mounts above the rotor. The discharge member will provide a passage from the central portion of the rotor to the exterior of the gas separator to discharge gas. The discharge member also provides a liquid passageway for the remaining portion of the well fluid to flow upward toward the intake of a pump.

While workable, improvements to the rotor and discharge member are desirable, both in the efficiency and the cost of the members.

SUMMARY OF THE INVENTION

In this invention, the discharge member is provided with an annular stationary skirt. The skirt extends downward into the rotor. Preferably, each of the rotor blades will have a notch located in its upper edge for receiving the lower termination of the skirt.

The skirt locates between the hub and the bore or side wall of the housing. This results in an annular gas cavity within the skirt to receive the gas flowing upward near the hub. A liquid passage is defined by the clearance between the exterior of the skirt and the bore of the housing. A gas discharge passage leads from the gas cavity to a gas outlet in the housing.

Each discharge member has a plurality of support members, each extending radially outward into contact with the bore of the housing. A gas passage extends through each support. A fastener extends through the housing wall to fasten one of the support members to the housing. In one embodiment, the gas separator is of a tandem type. It will have two or more rotors and two or more discharge elements located in series.

DETAILED DESCRIPTION OF THE INVENTION

Figure 1A:
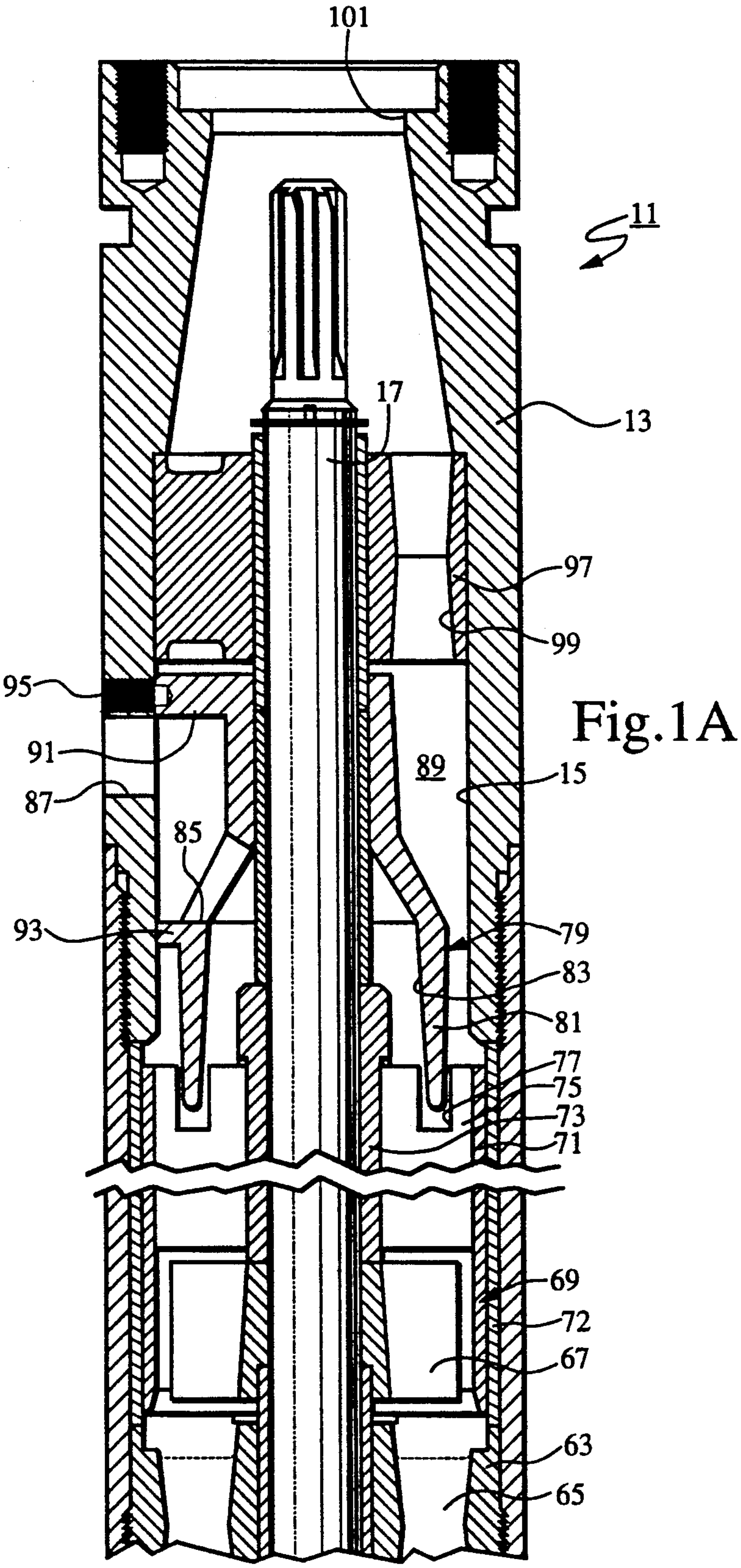
FIGS. 1A, 1B and 1C comprise a vertical sectional view of a gas separator constructed in accordance with this invention.
Figure 1B:
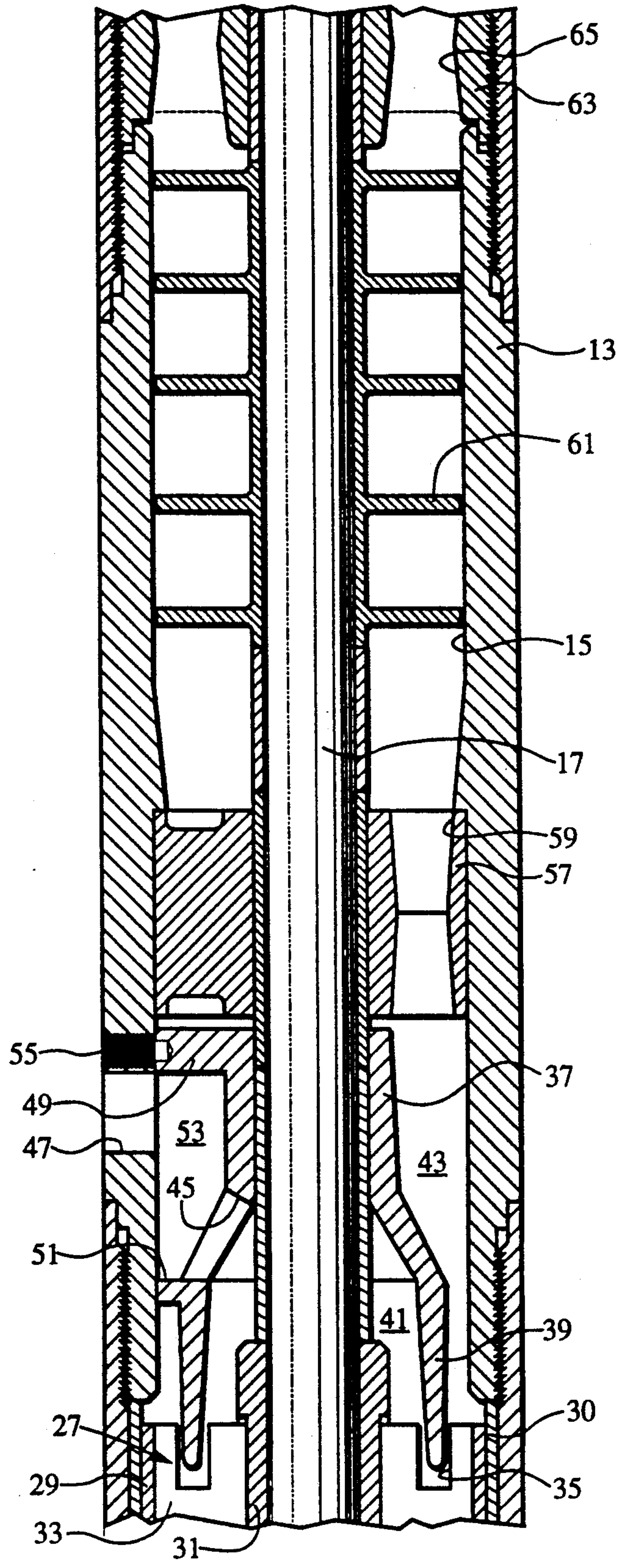
Figure 1C:
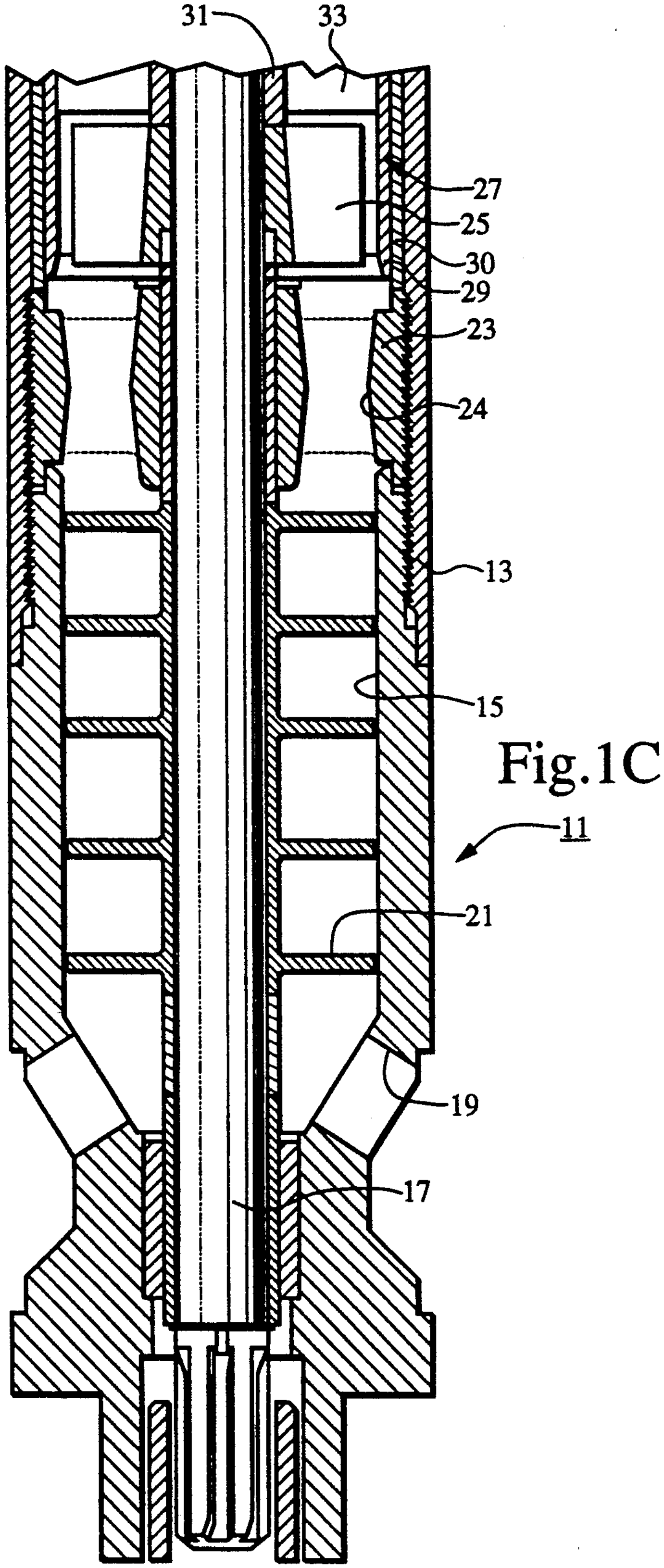

Referring to the drawings, and in particular to FIG. 1C, gas separator 11 has a cylindrical housing 13. Housing 13 has an axial inner passage 15. A shaft 17 extends through the passage 15. Shaft 17 will be driven by a motor (not shown) mounted below the gas separator 11 and separated by a seal section (not shown). An inlet 19 locates in the bottom of housing 13 for drawing well fluid into passage 15.

The well fluid proceeds first to an inducer 21. Inducer 21 comprises a helical screw mounted to the shaft 17 for rotation with it. Inducer 21 conveys the fluid upward and pressurizes the fluid to prevent expansion of the gas contained in the fluid at that point.

The well fluid then passes through a bearing 23, which is of a spider type, having a plurality of passages 24. The well fluid proceeds to a set of guide vanes 25. Guide vanes 25 are mounted to the shaft 17 for rotation therewith. Preferably there are more than one of the guide vanes 25, each comprising a flat or curved plate, and each being inclined relative to the axis of shaft 17. Guide vanes 25 impart a swirling motion to the well fluid.

Guide vanes 25 are located in the lower portion of a rotor 27. Rotor 27 has an outer cylinder 29 which extends down over guide vanes 25. Outer cylinder 29 encloses an inner hub 31 and is closely spaced within a stationary sleeve 30 mounted in the passage 15. Inner hub 31 mounts to the shaft 17 for rotation with the shaft 17. Two or more rotor vanes 33 (only two shown) extend between the hub 31 and the outer cylinder 29. Vanes 33 comprise longitudinal blades extending from the lower end to the upper end of the rotor 27. Each vane 33 is located in a radial plane of the axis of shaft 17. Each vane 33 is vertically oriented.

Referring to FIG. 1B, each vane 33 preferably has a notch 35 formed in its upper end. Notch 35 is a longitudinal slot that extends downward a short distance from the upper edge of each vane 33. In the embodiment shown, each notch 35 is located approximately midway between the hub 31 and the outer cylinder 29. The notches 35 also may be positioned to one side or the other of the midpoint between hub 31 and outer cylinder 29, depending on the amount of separation desired. The rotor 27 imparts a centrifugal force to the well fluid, causing heavier liquid components to flow outward toward the outer cylinder 29 as they progress up the rotor 27. The lighter gaseous phase will remain in the central portion of the rotor 27, near the hub 31.

A discharge member 37 mounts stationarily directly above rotor 27. Discharge member 37 does not rotate with shaft 17. Discharge member 37 has a depending skirt 39 that extends downward. Skirt 39 is concentric with shaft 17. Skirt 39 is annular, having an outer diameter significantly smaller than the inner diameter of the passage 15 of housing 13. The inner diameter of skirt 39 is significantly greater than the outer diameter of inner hub 31. This results in an annular gas cavity 41 located within skirt 39.

The clearance between the skirt 39 and the passage 15 comprises a liquid passage 43. The portion of the well fluid that does not enter gas cavity 41 will flow up through the liquid passage 43. A plurality of gas passages 45 (only one shown in FIG. 1B) extend through discharge member 37. In the embodiment shown, there are three of the gas passages 45, and each communicates with a gas outlet 47 extending through housing 13. Gas outlets 47 allow separated gas to be discharged into the well.

Figure 2:
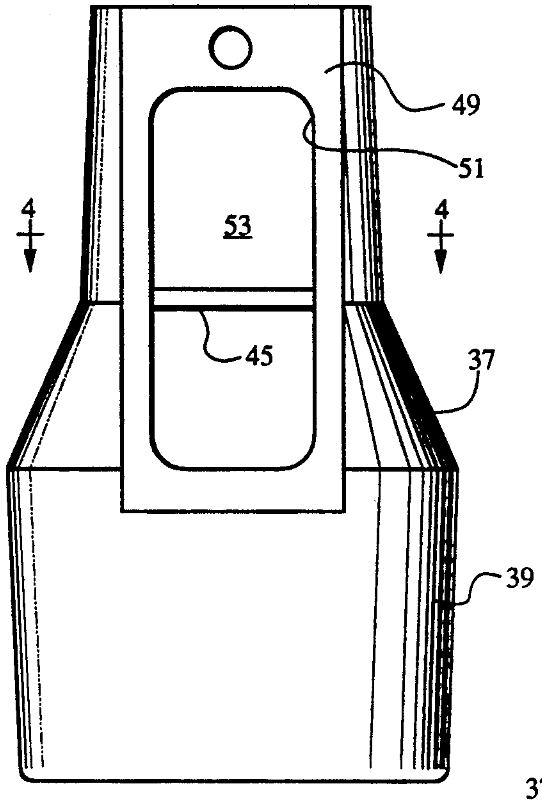
FIG. 2 is a side view of the discharge member used in the gas separator of FIG. 1, and showing a side 90 degrees from the position shown in FIG. 1.
Figure 3:
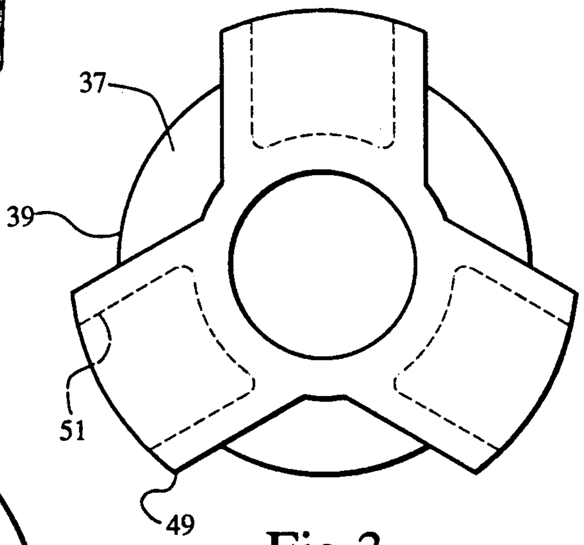
FIG. 3 is a top plan view of the discharge member of FIG. 2.
Figure 4:
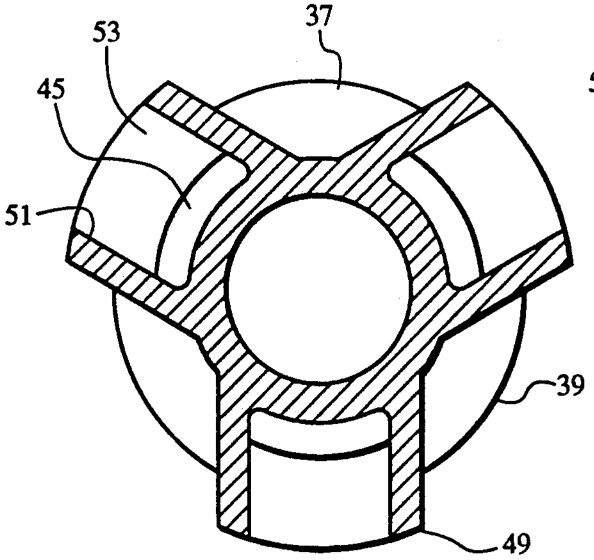
FIG. 4 is a sectional view of the discharge member of FIG. 2, taken along the line IV—IV of FIG. 2.

As shown also in FIGS. 3 and 4, discharge member 37 has a plurality of laterally extending supports 49. In the embodiment shown, there are three supports 49 spaced 120 degrees apart from each other. The supports 49 extend out into contact with the passage 15. Each support 49 has a generally rectangular perimeter, having flat upper and lower edges and side edges, as shown in FIG. 2. The outer face of each support 49 is a segment of a cylinder having approximately the same diameter as the inner diameter of passage 15. The outer face of each support 49 extends circumferentially about 45 degrees.

The well fluid in the liquid passage 43 flows between the supports 49. A window 51, which is rectangular in the embodiment shown, is located in the outer face of each support 49. Window 51 registers with one of the gas outlets 47 (FIG. 1) and communicates with a cavity 53 defined by the interior of each support 49. Window 51 and cavity 53 may be considered a part of the gas passage 45 leading to a gas outlet 47 (FIG. 1). A fastener, screw 55, or locking device extends through a hole in housing 13. The tip of screw 55 engages a dimple provided in one of the upper supports 49. This engagement prevents rotation of the discharge member 37 and also fixes the discharge member 37 axially.

Referring still to FIG. 1B, a bearing 57 mounts in housing 13 directly above discharge member 37. Bearing 57 has a plurality of axial passages 59 extending through it.

In the embodiment shown, the gas separator 11 is of a tandem type, and can have two or more units joined in series depending upon well conditions. That is, there are two separate and independent separator portions. The structure of the separator portion above bearing 57 is the same as that below. This structure includes an inducer 61. A bearing 63 locates above inducer 61. The well fluid passing through liquid passage 43 may still contain some gas. The well fluid flows through passages 65 in bearing 63 to an upper guide vane 67. Upper guide vane 67 rotates with shaft 17.

Upper guide vane 67 locates in the lower portion of an upper rotor 69. Rotor 69 has an outer cylinder 71 closely spaced to a stationary sleeve 72 in housing 13. An inner hub 73 mounts to shaft 17 for rotation with shaft 17. A plurality of longitudinal vanes 75 extend between inner hub 73 and outer cylinder 71. Each vane has a notch 77 in its upper edge.

An upper discharge member 79 mounts stationarily above upper rotor 69. Upper discharge member 79 has a depending skirt 81, the lower edge of which extends into the notches 77. Skirt 81 defines a gas cavity 83 on its inner diameter. Three gas passages 85 lead through the upper discharge member 79, each to an upper gas outlet 87. Liquid passage 89 is located in a clearance between the skirt 81 and the inner diameter of housing 13.

The upper discharge member 79 has three supports 91, each having a window 93. The supports 91 extend to the inner diameter of housing 13 and are circumferentially spaced apart from each other. A fastener 95 extends through a threaded hole in housing 13 and has an inner end that engages the support 91.

A bearing 97 mounts in housing 13 above upper discharge member 79 for supporting shaft 17. Bearing 97 has one or more axial passages 99 for the flow of well fluid. The well fluid flows through a bore outlet 101 on the upper end into the intake of a pump (not shown).

In operation, the well fluid flows in intake 19 (FIG. 1C). The inducer 21 will apply pressure to the well fluid, which then flows through guide vanes 25 into rotor 27. The spinning rotor 27 causes some separation of the gas and liquid, with the heavier liquid components moving outward toward the outer cylinder 29.

Referring to FIG. 1B, the gaseous phase remains near inner hub 31 and will flow through the gas cavity 41, gas passage 45 and out the gas outlet 47. The remaining portion of the well fluid, which may be a mixture of liquid and gas, will flow up the liquid passage 43 and through the bearing passage 59.

The well fluid at that point enters a second separation stage which operates in the same manner as previously described. The well fluid is pressurized again by an inducer 61. The well fluid flows into rotor 69 (FIG. 1A). Again, separation occurs. The separated gas flows through gas cavity 83, gas passage 85 and out gas outlet 87. The remaining well fluid flows up the liquid passage 89, through the passage 99 and out the bore outlet 101. The well fluid then enters the intake of a pump (not shown).

The invention has significant advantages. Utilizing a stationary skirt with the diffuser enhances separation of the liquid and gaseous components. The stationary skirt is less expensive to manufacture than a rotating skirt such as used in one prior art type of gas separator. The discharge members are easier to install as they are held by fasteners rather than by axial compression as in one prior art type.

While the invention has been shown in only one of its forms, it should be apparent to those skilled in the art that it is not so limited, but is susceptible to various changes without departing from the scope of the invention.

I claim:

1. In a gas separator for a submersible centrifugal pump for a well, the gas separator having a cylindrical housing with a bore extending therethrough, a shaft driven by a motor of the pump and extending axially through the bore, an intake in the lower end of the housing for receiving well fluid containing liquid and gas, a rotor mounted to the shaft for rotation therewith for receiving well fluid flowing through the bore of the housing and forcing liquid of the well fluid radially outward while the gas flows through a central portion of the rotor, the rotor having an inner hub and at least one longitudinal vane extending radially outward from the inner hub, and a discharge member mounted stationarily above the rotor and about the shaft for directing the gas outward into the well and directing the liquid upward into an intake of the pump, the improvement comprising in combination:

an annular stationary skirt on the discharge member extending downward into the rotor radially outward of the hub and radially inward of the outer periphery of the rotor, the interior of the skirt defining a gas cavity, the skirt having an upper portion having a gas outlet connected to a gas outlet in the housing for discharging gas into the well, the exterior of the skirt defining a liquid passage for the passage of the liquid to the intake of the pump; and a notch formed in an upper edge of the vane for receiving a lower edge of the skirt.

2. The gas separator according to claim 1 wherein the discharge member further comprises:

a plurality of circumferentially spaced apart supports, each extending radially outward from the discharge member into contact with the bore of the housing; and a fastener extending through a wall of the housing into engagement with one of the supports for securing the discharge member within the housing.

3. In a gas separator for a submersible centrifugal pump for a well, the gas separator having a housing having a cylindrical sidewall with a bore extending therethrough, a shaft driven by a motor of the pump and extending axially through the bore, an intake in the lower end of the housing for receiving well fluid containing liquid and gas, a rotor mounted to the shaft for rotation therewith for receiving fluid flowing through the bore of the housing and forcing liquid of the fluid radially outward while the gas flows through a central portion of the rotor, the rotor having an inner hub and at least one longitudinal vane extending radially outward from the inner hub, the improvement comprising in combination:

a gas outlet formed in the sidewall of the housing;

a discharge member having an annular stationary skirt extending about the shaft and located above the rotor radially outward of the shaft and radially inward of the bore of the housing, the interior of the skirt defining a gas cavity for receiving gas flowing upward from the rotor, the exterior of the skirt defining an annular passage between the bore of the housing and the skirt for the passage of liquid flowing upward from the rotor;

gas passage means leading from the interior of the skirt to the gas outlet in the housing;

the discharge member having a plurality of supports connected to the skirt and extending upward therefrom, each extending radially outward into contact with the sidewall of the housing, the supports being circumferentially spaced apart from each other, defining vertical passages between the supports for upward flow of liquid flowing past the exterior of the skirt; and a fastener extending through the sidewall of the housing into engagement with one of the supports for securing the discharge member within the housing.

4. The gas separator according to claim 3 wherein the gas passage means extends through at least one of the supports for communicating gas from the gas cavity to the gas outlet.

5. In a gas separator for a submersible centrifugal pump for a well, the gas separator having a cylindrical housing with a bore extending therethrough, a shaft driven by a motor of the pump and extending axially through the bore, an intake in the lower end of the housing for receiving well fluid containing liquid and gas, a gas outlet in the housing for discharging separated gas into the well, and a liquid outlet at the upper end of the bore for discharging liquid to an intake of the pump, an improved means for separating the gas from the liquid in the gas separator, comprising in combination:

a rotor having an outer cylinder, an inner hub, and at least one longitudinal vane extending between the outer cylinder and the inner hub;

means for mounting the inner hub to the shaft for rotating the hub, vane, and outer cylinder in unison with the shaft;

the rotor having open upper and lower ends for receiving fluid flowing through the bore of the housing, the rotation of the rotor by the shaft causing centrifugal force to force liquid radially outward toward the outer cylinder while the gas flows through a central portion of the rotor;

a notch formed in the upper end of the vane between the outer cylinder and the hub;

a discharge member mounted stationarily above the rotor, the discharge member having an annular stationary skirt extending downward into notch, defining an inner gas cavity within the skirt to receive the gas flowing upward near the hub;

a gas discharge passage leading from the gas cavity out of the discharge member to the gas outlet in the housing; and a liquid passage located between the exterior of the skirt and the bore of the housing for causing the liquid received from the rotor to flow upward to the liquid outlet of the gas separator.

6. The gas separator according to claim 5 wherein there are a plurality of gas outlets in the housing, and wherein the discharge member further comprises:

a plurality of supports extending radially outward from the discharge member into contact with the bore;

the gas passage extending through each of the supports for communication with one of the gas outlets.

7. The gas separator according to claim 6 further comprising:

a hole provided in the housing adjacent one of the supports; and a fastener extending through the hole and engaging one of the supports to prevent rotation of the discharge member.

8. A tandem gas separator for a submersible centrifugal pump for a well, comprising in combination:

a cylindrical housing having a bore therethrough, the housing having an intake in the lower end of the housing for receiving well fluid containing liquid and gas;

a shaft driven by a motor of the pump and extending axially through the housing;

axially spaced apart upper and lower inducers, each comprising a helical screw and mounted to the shaft for rotation therewith;

axially spaced apart upper and lower rotors mounted to the shaft for rotation therewith, the lower rotor being mounted above the lower inducer and the upper rotor being mounted above the upper inducer, each rotor having an outer cylinder, an inner hub, and at least one longitudinal vane extending between the outer cylinder and the inner hub;

a longitudinally extending notch formed in an upper edge of the vane of each rotor, the notch being located radially between the inner hub and the outer cylinder;

each of the rotors having open upper and lower ends for receiving fluid flowing through the bore of the housing, the rotation of the rotor by the shaft causing centrifugal force to force liquid radially outward toward each outer cylinder while the gas flows through a central portion of each rotor;

axially spaced apart upper and lower discharge members mounted stationarily in the housing, the upper and lower discharge members each having an annular stationary skirt extending downward into the upper and lower rotors, respectively, each skirt having a lower edge terminating in one of the notches, defining an inner gas cavity within the skirt of each discharge member to receive the gas flowing upward near the hub;

upper and lower gas discharge passages leading from the gas cavities out of the upper and lower discharge members, respectively, to upper and lower gas outlets in the housing; and upper and lower liquid passages located between the exterior of the skirts of the upper and lower discharge members, respectively, and the bore of the housing for causing the liquid received from the rotors to flow upward to a liquid outlet of the gas separator.

9. The gas separator according to claim 8 wherein there are a plurality of lower gas outlets in the housing and a plurality of upper gas outlets in the housing, and wherein each discharge member further comprises:

a plurality of circumferentially spaced apart supports, each extending radially outward into contact with the bore; and each of the gas discharge passages extending through one of the supports for communicating with one of the gas outlets.

10. The gas separator according to claim 9 further comprising:

a hole provided in the housing adjacent one of the supports of each discharge member; and a fastener extending through the hole and engaging one of the supports of each discharge member to prevent rotation of each discharge member.

* * * * *